Figure 1:
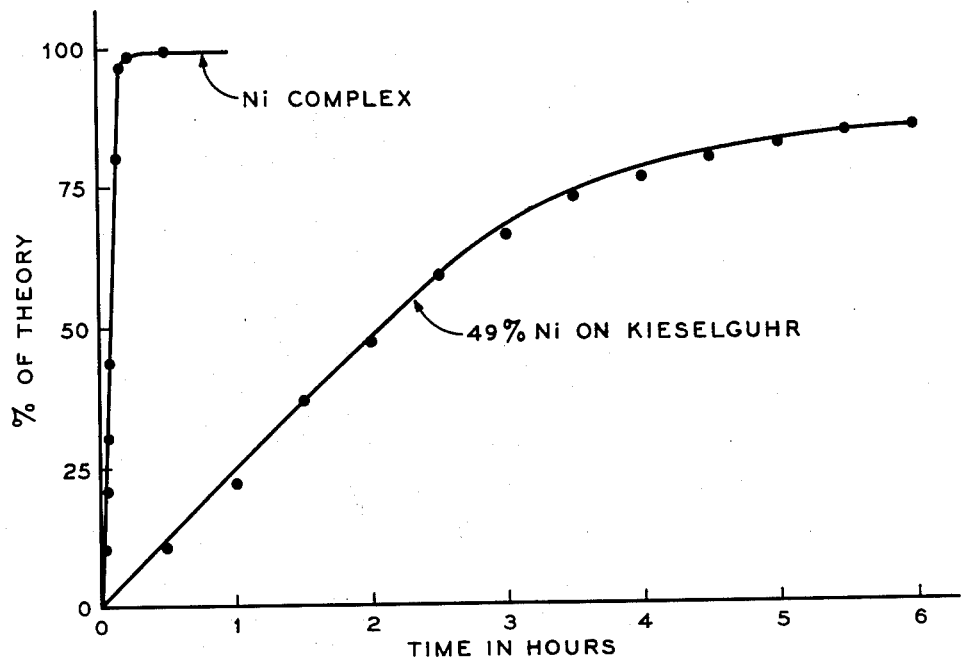

Sept. 7, 1965      S. J. LAPPORTE      3,205,278
PREPARATION OF COMPLEX ORGANIC METALLIC
HYDROGENATION CATALYSTS AND THEIR USE
Filed March 14, 1963

HYDROGENATION OF BENZENE (1.0 MOLE) 176 MG
NICKEL (150 C., $P_{H_2}$ = 35-69 ATMOSPHERES)

HYDROGENATION OF BENZENE (1.0 MOLE) VARIATION OF
NICKEL SALT (150° C., $P_{H_2} \cong$ 35-70 ATMOSPHERES)

INVENTOR
SEYMOUR J. LAPPORTE

United States Patent Office 3,205,278
Patented Sept. 7, 1965

3,205,278
PREPARATION OF COMPLEX ORGANIC METALLIC HYDROGENATION CATALYSTS AND THEIR USE
Seymour J. Lapporte, Berkeley, Calif., assignor to California Research Corporation, San Francisco, Calif., a corporation of Delaware
Filed Mar. 14, 1963, Ser. No. 265,234
14 Claims. (Cl. 260—667)

This invention relates to novel and improved hydrogenation catalysts containing 3-d complex elements, the method of their preparation, and their use as catalysts in the hydrogenative reduction of reducible compounds. More particularly, this invention relates to the preparation and use of stabilized reactive 3-d complex metal-element-containing hydrogenation catalysts useful in the hydrogenative reduction of reducible organic compounds by the reaction of a Mendelyeev Table Group III organometallic compound with 3-d complex metal element salts of acidic organic compounds.

It is well known to prepare 3-d complex metal elements in a reduced form as reactive hydrogenation catalysts. These known catalysts suffer a number of important deficiencies and in particular from the lack of a rapid, reliable and convenient means of preparation. Preparative procedures are lengthy and inconvenient, requiring, for example, the removal of unwanted alloyed aluminum by leaching with strong caustic, method of Raney, and washing with large volumes of water, drying, and the like. Where a form of such a metal hydrogenation catalyst disposed upon an inert support is desired, because of the relatively inefficient unit activity of Raney-type catalyst materials, correspondingly lengthy preparations are required, including adsorption upon an inert support of the metal in salt form, such as a nitrate, from an aqueous solution, followed by a conditioning at high temperatures of the supported catalyst, etc. Moreover, because the active catalysts are highly pyrophoric in nature, great care is necessary to exclude oxygen; and because they are extremely sensitive to poisoning through contact with many common substances, these known catalysts have poor storage characteristics. Known inertly-supported hydrogenation catalysts inherently are inefficient because appreciable portions of costly reactor volumes are taken up by the inert support material. Other disadvantages include problems associated with the metering of solids, and particularly catalyst-poison-sensitive and pyrophoric solids, into a reaction zone, and temperature control during hydrogenations.

It has now been found that highly active 3-d complex element-containing hydrogenation catalysts can be rapidly and conveniently prepared by contacting in the ratio of one formula weight of a 3-d complex element having an atomic number greater than 20 and less than 30 in the form of a metal salt of an acidic, organic compound having a pKa in the range from about 1–20, containing 1–2 acidic hydrogen atoms and from 1–25 carbon atoms per molecule and only carbon, hydrogen, and oxygen, with from 1–6 moles of a Mendelyeev Periodic Table Group III organometallic compound, $MR_3$, in which M is a Group III element and R is selected from the radical groups consisting of hydrocarbyl and hydrogen, said hydrocarbyl radicals having from 1–20 carbon atoms per group and wherein at least one radical group of said compound is hydrocarbyl.

By 3-d complex element is meant a metal element of the iron group which is capable of complex formation employing 3-d orbitals.

In general, the hydrogenation catalysts prepared in the manner of the present invention are non-pyrophoric, are ready for immediate use upon the simple mixing of the catalyst components, and in the preferred form are readily suspended in the hydrogenation reaction mixture.

Because of their extremely finely divided form and because of the stability of the catalyst complex under hydrogenation conditions, the novel catalysts of the present invention have substantially improved hydrogenation activities per unit weight of the 3-d complex metal over the corresponding hydrogenation activities of known catalysts. The present hydrogenation catalysts are consistently and uniformly active catalysts. A further advantage of these catalysts resides in the fact that they lend themselves to some degree of variation in their hydrogenation selectivities through the use of metal salts whose anions, by reason of their stereochemical configuration, can alter the degree of availability of the catalytic site in the hydrogenation substrate to the compound which is to be hydrogenated. Surprisingly, even in the reduced form, the 3-d complex metal element after reaction of the salt form with the organometallic compound, wherein all or substantially all of the chemical bonding potential of the metal has been neutralized by the reduction thereof, appears to be bound in a stable complex in which the Group III metal and the acid anion, possibly in a reduced form, play a cooperative role.

In general, the complex metal catalysts of the present invention are useful for the hydrogenative reduction of compounds for which these metals are known to be useful catalysts. Moreover, in view of the substantially improved activities and relative efficiencies of the catalysts of the present invention, generally smaller relative amounts of catalyst are required, and, frequently, milder hydrogenation conditions, such as temperature, pressure, and the like, can be employed. Thus, the catalysts of the present invention may be used, in general, under hydrogenation conditions for the reduction of most of the same reducible compounds, preferably organic compounds, as are known to be hydrogenated in the presence of prior art iron-group element hydrogenation catalysts prepared by the method of Raney. Thus, the unsaturation present in reducible organic compounds containing only carbon, hydrogen, oxygen, nitrogen and combinations thereof, having one or more unsaturation sites in the form of:

(1) carbon—carbon
(2) carbon—nitrogen
(3) carbon—oxygen, and
(4) nitrogen—oxygen, unsaturation can, in general, be readily hydrogenatively reduced in the presence of an appreciable hydrogen partial pressure and the novel catalyst complexes of the present invention. Specific types of reducible unsaturated organic compounds contemplated include hydrocarbons, nitriles, ketones, carbinols, esters, amines, heterocycles, ethers, amides, and the like.

By a reducible organic compound is meant one which adds hydrogen by chemical bonding when contacted under hydrogenation conditions, with hydrogen gas and a catalyst complex as prepared in the present invention. By hydrogenation conditions is meant contacting in a reaction zone (1) the reducible organic compound, (2) hydrogen gas, and (3) the hydrogenation catalyst at a temperature in the range from about $-10°$ to $300°$ C., a hydrogen partial pressure in the range from about atmospheric up to 1000 atmospheres, for a period ranging from about one second up to as much as 50 hours, and even higher.

By 3-d complex metals is meant particularly those elements having atomic numbers greater than 20 and less than 30. Because of their general superiority as hydrogenation catalysts, the preferred catalyst complexes of the present invention are those containing elements having atomic numbers greater than 25 and less than 29; and of this group, nickel is particularly preferred.

The actual chemical structure of the catalyst complex of the present invention is not known.

Depending upon which metal salt is employed, when from about 2–5 moles of a trialkyl or triaryl Group III metal, for example, triethylaluminum or triphenyl-aluminum, are added to one formula weight of the 3-$d$ complex metal salt, a highly active hydrogenation catalyst results. A chemical reaction takes place, as generally evidenced by evolution of heat of reaction and the formation of hydrocarbon by-product.

For the preparation of the effective hydrogenation catalysts of the present invention, particular amounts of organometallic compound must be used for each formula weight of the 3-$d$ complex metal organic acid salt. Thus, when less than one mole of organometallic compound, for example, a trialkylaluminum, is used for each formula weight of 3-$d$ complex metal salt, the resulting unit hydrogenation activity of the reaction product is unsatisfactory. Similarly, when more than about 6 moles of the organometallic component is used for each formula weight of the 3-$d$ complex metal salt, unit hydrogenation activity is substantially lower than the values found for the preferred ratios, namely, from about 2–5 moles of an organometallic compound per formula weight of the metal salt. Although some variation is noted, depending upon the particular 3-$d$ complex element salt being used, the particularly preferred range is 2.5–4.5 moles of trialkylaluminum per formula weight of salt.

Although the preparation of the active hydrogenation catalyst complexes of the present invention can be accomplished by mixing the necessary proportions of essentially anhydrous finely divided solid metal salt and organometallic compound, in the presence of an inert atmosphere, preferably, catalyst preparation is accomplished by reaction in the presence of an inert liquid diluent. An inert atmosphere is one substantially free of oxygen, water vapor, and other compounds known to be reactive toward organometallics, as well as compounds such as amines, ethers, etc., containing atoms having unshared electron pairs, such as oxygen. Similarly, an inert diluent is one free of reactive groups (relative to the organometallic component of the catalyst) and electron-pair donor atoms, such as oxygen. Once prepared, the hydrogenation catalysts, surprisingly, appear to suffer no ill effects from contact with ethers, alcohols, ketones, esters, amines, nitriles, and the like, whereas prior contacting of the organometallic compound and the metal salt in the presence of an ether, such as tetrahydrofuran, does not result in the production of active hydrogenation catalysts.

Inert diluents useful in catalyst preparation are, in general, hydrocarbons, including benzene, toluene, t-butylbenzene, white oils, hydrocarbon waxes, pentane, heptane, and olefins. Where the unsaturated feed to be hydrogenated is a hydrocarbon, naturally preparation in situ is particularly convenient because subsequent purifications, if required, are greatly simplified. Similarly, where an unsaturated hydrocarbon diluent is used in catalyst preparation, some hydrogen may be consumed in saturating it, but no substantial disadvantages are experienced.

Except in their use as hydrogenation catalysts for the reduction of unsaturated hydrocarbons, preferably and advantageously, the catalyst complexes of the present invention are prepared in advance of use in an inert diluent. The catalyst components react rapidly, even at moderate temperatures, i.e., from about 0°–100° C., as well as at reduced and elevated temperatures, i.e., from about −50° to about 200° C., and higher, but below the well-known thermal decomposition temperature of the 3-$d$ complex metal salts and the organometallic compounds. In general, but with some relatively minor variation, depending upon the nature of the material to be hydrogenated, and the particular metal salt employed, the hydrogenation catalysts may be used as catalysts over a wide range of temperature, such as, for example, −10° C. to as high as 300° C. Preferably, useful temperatures are in the range from about 20° to 200° C.

The 3-$d$ complex metal salts useful in the preparation of the hydrogenation catalysts must be salts of acidic organic compounds. In general, salts of organic acids having pKa values as measured in an ether medium at 25° C. in the range 1–20 are satisfactory metal salts for use in the catalyst preparation. Preferably, the acid is composed of only carbon, hydrogen, and oxygen, and contains 1 or 2 acidic hydrogen atoms.

The preferred metal salts are salts of monobasic, strongly-acidic, organic acids having pKa's less than 9. In general, these acids are carboxylic acids having from 1–25 carbon atoms per molecule, containing only hydrogen, carbon, and oxygen.

By monobasic is meant an organic acid having only one acidic hydrogen per molecule within the pKa range from 1–20.

Particularly preferred for catalyst preparation are the 3-$d$ complex metal salts of monobasic, strongly-acidic, organic acids, the salts of which are soluble in benzene at 25° C. to some appreciable degree, i.e., of the order of about 0.1 weight percent and higher, based on benzene solvent. In general, these metal salts will be those of organic acids having from about 6–25 carbon atoms per molecule, and these limits can vary in some slight degree, depending upon the particular metal cation and upon the carbon structure of the hydrocarbon skeleton of the metal salt anion.

Of the 3-$d$ complex metal hydrogenation catalysts contemplated in the present invention, those catalysts prepared by the use of hydrocarbon or inert-medium soluble nickel salt are most preferred, because of substantial advantages experienced in their use in catalyst preparations and because of the exceptionally high unit activity of the resulting nickel hydrogenation catalyst complexes in the hydrogenation of reducible organic compounds. Thus, while the medium insoluble nickel salts of organic acids upon reaction with the required amount of the organometallic compound generally yield active but partially agglomerated catalyst complexes, the catalyst obtained from the medium soluble nickel salts are stable complexes of extremely fine division, generally capable of remaining dispersed even in ultra-high centrifuge force fields, such as one generated at 60,000 r.p.m. for long periods.

Less desirble than the metal salts of strongly-acidic, organic acids, but nonetheless useful for hydrogenation catalyst preparation, are the metal salts of weakly acidic, organic acids having pKa values in the range from about 9–20, having from 1–25 carbon atoms, 1–2 acidic hydrogen atoms, and containing only carbon, hydrogen, and oxygen. Included among the weak acids whose 3-$d$ complex metal salts are contemplated for use in hydrogenation catalyst preparation are those of the carbinols, such as methanol, butanol, hexyl alcohol, 2-ethylhexanol, lauryl alcohol, stearyl alcohol, $C_{25}H_{51}OH$, octyl alcohol, cyclo hexanol, octanol, isobutanol, eicosanol, oleyl alcohol, octadecenol, phenol, lauryl phenols, t-butyl phenols, naphthols, glycols, n-$C_{10}H_{21}CHOHCH_2OH$, and of the $\beta$-diketones, such as acetylacetonate, and higher molecular weight analogs of acetylacetonate, and the like. The metal salts of weak organic acids are less desirable for a number of reasons, including, in general, the relative difficulty in preparation in the required essentially anhydrous salt form, the susceptibility of most of these metal salts to hydrolysis, a tendency to form agglomerated catalysts of somewhat lesser unit activity, and the like.

Included among metal salts of the preferred monobasic, strongly-acidic, organic acids are the salts of the acids: formic, acetic, propionic, n-butyric, isobutyric, n-pentanoic, isopentanoic, hexanoic, valeric, isovaleric, benzoic, alkylbenzoics, including toluics, butylbenzoics, hexylbenzoics, and the like; naphthoics, biphenylcarboxylic acids, and higher aromatic hydrocarbon carboxylic acids; higher aliphatic carboxylic acids (alkyl and alkenyl and cycloalkyl, cycloalkenyl) such as 2-methyl-pentanoic, 2-ethylpentanoic, naphthenic, octanoic, 2-methyl-octanoic, pelargonic, decanoic, 2-methyldecanoic, individual and mixed 2-methyl-n-($C_8$-$C_{20}$) carboxylic acids, undecylenic, undecylic, oleic, hydrocinnamic, lauric, myristic, palmitic, erucic, hexylcyclohexane, carboxylic, butyl cyclohexane carboxylics, stearic, cyclohexenecarboxylics, and the like.

Additional useful metal salts in the catalyst preparation are the salts of dibasic organic acids, such as carbonic, oxalic, maleic, malonic, adipic, succinic, glutaric, and their alkyl-, alkenyl- and aryl-substituted analogs. Other dibasic organic acids contemplated may have a weak acid function and a strong acid function, such as lactic acid, p-hydroxybenzoic acid, and the like.

Representative metal salts are nickel naphthenate, nickel 2-ethylhexanoate, nickel benzoate, nickel phenate, nickel acetate, nickel oleate, nickel 2-methyloctanoate; cobalt naphthenate, cobalt acetates (-ous and -ic), cobalt o-toluate, cobalt naphthoate, cobalt oleate, cobalt 2-ethyl-hexanoate, cobalt linoleate, cobalt palmitate; iron acetate, iron naphathenate, iron 2-methylnonate, iron benzoate, iron formate, iron lactate, iron acetylacetonate; manganese acetate, manganese benzoate, valerate, oxalate, etc., chromium 2-ethylhexanoate, 2-methyldecanoate, palmitate, naphthenate, 4-t-butylbenzoate, caproate; vanadyl acetate, benzoate, stearate, vanadium alkoxides, such as ethoxide, O-n-octyl, O-2-ethylhexyl; titanium oxalate, alkoxides, such as $Ti(OEt)_4$, $Ti(OC_8H_{17})_4$, $Ti(O-stearyl)_4$; copper acetate, cupric benzoate, cuprous carbonate, cupric butyrate, ethylacetoacetonate, laurate, valerate, 2-methyldodecanoate, oleate, stearate, 2-ethylhexanoate, naphthenate, and the like.

The Group III compound component of the complex hydrogenation catalyst is preferably aluminum. The aluminum compounds are particularly preferred. In any case, the compound can be represented by the formula $MR_3$ wherein M corresponds to the metal element and R to hydrogen and hydrocarbyl radicals. At least one of the R radicals must be a hydrocarbyl radical. In a given compound $MR_3$, all the radicals save hydrogen may be the same or they may be different. By hydrocarbyl is meant a stable hydrocarbon radical consisting of carbon and hydrogen, including alkyl, aryl, cycloalkyl, alkenyl, alkynyl, cycloalkenyl and alkylaryl. Each radical can have from 1–20 carbon atoms per radical. Higher molecular weight radicals may be used but there appears to be no corresponding advantage.

Representative organometallic compounds are trimethyl aluminum, triethyl aluminum, triisobutyl aluminum, triphenyl aluminum, tri-n-eicosanyl aluminum, diisobutyl aluminum hydride, isobutyl aluminum dihydride, β-3-cyclohexenylethyl aluminum, trihexadecyl aluminum, triethyl boron, triphenyl boron, trihexadecyl boron, dimethyl vinyl boron, divinyl methyl boron, triisobutyl boron, tri-n-butyl boron, bis-3-methyl-2-butylborane, and the like. Other Group III organometallic compounds can also be used but are much less practicable.

Representative reducible compounds are:

(I) *Unsaturated hydrocarbons*

Acetylene, ethene, propene, 2-methylhexadecene-1, octene-2, benzene, cyclohexene, cyclohexadiene, toluene, naphthalene, α-n-butylnaphthalene, biphenyl, anthracene, chrysene, 1,3-butadiene, vinylcyclohexene, n-butylbenzene, 1,5,9-cyclododecatriene, cyclooctene, cyclooctatetraene, styrene, ethylbenzene, indene, 1-heptyne, i.e., unsaturated hydrocarbons in general having melting points below about 300° C. or which are soluble in a liquid hydrocarbon at a temperature below about 300° C., and in particular, cyclic unsaturated hydrocarbons are contemplated.

(II) *Compounds containing carbon-nitrogen unsaturation*

Acetonitrile, propionitrile, benzonitrile, isovaleronitrile, m-tolunitrile, margaronitrile, 2-naphthonitrile, pyridine, quinoline, isoquinoline, $\phi$—N=CH—$CH_2CH_3$, $$\phi N=C(CH_3)_2$$

i.e., Schiff's basis and addimines, ketimines; ketoneoximes ($R_1R_2$—C=NOH) of such representative ketones as acetone, methylethyl ketone, cyclohexanone, phorone, acetophenone, menthone, isovalerophenone, α-naphthoquinone, methyl β-naphthyl, ketone, laurone; also phenylhydrazones ($\phi$—NH—N=$CR_1R_2$) of the above ketones, as well as of aldehydes, such as acetaldehyde, butyraldehyde, etc., i.e., organic compounds containing carbon-nitrogen unsaturation having melting points below about 300° C. or which are soluble in inert liquid media at temperatures below about 300° C.

(III) *Compounds containing carbon-oxygen unsaturation* ($R_1R_2C=O$)

Acetone, methylethyl ketone, acetophenone, benzoquinone, quinone, phorone, thujone, cyclohexanone, n-hexylmethyl ketone, ethyl octyl ketone, α-naphthyl, n-butyl ketone, carvone, etc., i.e., compounds containing carbon-oxygen unsaturation having melting points below about 300° C. or which are soluble in inert liquid media at temperatures below about 300° C.

(IV) *Compounds containing nitrogen-oxygen unsaturation*

Nitrosobenzene, nitrocyclohexane, 1-nitropropane, 1-nitrobutane, nitrobenzene, nitromethane, O-nitrotoluene, β-nitronaphtholine, nitrocyclohexene, i.e., compounds containing nitrogen-oxygen unsaturation having melting points below about 300° C. or which are soluble in inert liquid media at temperatures below about 300° C.

(V) *Other*

Pyrrole, oleylamine, acrylonitrile, dimethyl terephthalate, methyl oleate, maleic anhydride, furan, phenol, alkyl ($C_1$–$C_{20}$) substituted phenols having preferably 1-2 alkyl-substituted groups, methyl naphthyl ethers, methyl p-cyanobenzoate, N≡C—$(CH_2)_4CO_2CH_3$,

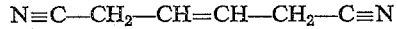

methyl benzoate, methyl α-naphthoate, ethyl t-butyl benzoate, phenyl methyl ether, methyl 3-furanoate, ethyl linolenate, linseed oil, fish oils, vegetable oils, and the like, i.e., reducible unsaturated organic compounds having melting points below about 300° C. or which are appreciably soluble in relatively inert media, such as hydrocarbons, ethers, alcohols, and the like, at temperatures below about 300° C.

Particularly preferred among the above reducible organic compounds as hydrogenation feeds are the lower ($C_1$–$C_4$) alkanol esters of the unsubstituted benzene carboxylic acids, such as benzoic, phthalic, isophthalic, terephthalic, pyromellitic, trimisic, as well as the higher benzene carboxylic acids. The lower alkyl ($C_1$–$C_4$) substituted esters are also desirable feeds.

By relatively inert is meant media which do not destroy the catalytic activity under hydrogenation conditions and which are not preferentially reduced in a competition with the hydrogenation substrate. For example, individually, butadiene and benzene can be readily hydrogenated in the presence of a nickel catalyst complex. Butadiene is more readily hydrogenated than benzene. Therefore, benzene can be used as a medium for the hydrogenation of butadiene. In the hydrogenation of an unsaturated hydrocarbon, such as benzene, water inhibits the desired reduction. However, in the hydrogenation of phenol, water promotes the reduction.

The following examples further illustrate the invention:

*Example 1—Catalyst preparation*

(A) Into a previously dried reaction zone essentially freed of molecular oxygen and under an inert nitrogen atmosphere was placed benzene and nickel 2-ethyl-hexanoate in the ratio of one mole of benzene and 0.0032 formula weight of the metal salt. To the solution thus formed was added triethylaluminum in the ratio of 0.095 mole per mole of benzene. A reaction occurred which was, for all practical purposes, instantaneous. The temperature of contacting was about 25° C. The resulting product was extremely finely divided, was homogeneously distributed throughout the liquid phase, imparting a black color thereto and, although it was clearly a finely dispersed solid, it could not be precipitated in an ultracentrifuge. When the solution was thoroughly contacted with an acidic aqueous solution, the stable catalyst complex was destroyed and it was possible to recover essentially quantitatively the organic acid, 2-ethylhexanoic acid. The prepared catalyst complex was not pyrophoric when allowed to come into contact with oxygen or air. Measurements using a magnetic balance indicated that the catalyst complex contained no unpaired electrons. When the catalyst and a reducible organic compound were contacted under hydrogenation conditions in the presence of an appreciable partial pressure of hydrogen gas, a rapid hydrogenative reduction of the organic compound took place. When saturated hydrocarbons, such as pentane, heptane, cyclohexane, are substituted for benzene, the same active hydrogenation catalyst complexes appear to be produced.

(B) In the relative proportions and as in A above, to a slurry of finely-divided anhydrous nickel benzoate in benzene was added triethylaluminum. A fairly rapid reaction occurred and the resulting product was found to be partially distributed in the liquid phase in a homogeneous manner, as was the product in A, but a substantial portion of the product was also present as an agglomerated black solid. Although the agglomerated portion of the product did not appear to be readily dispersible in the liquid phase, the catalyst was tested under hydrogenation conditions in the presence of a reducible organic compound, and was found to be a very effective hydrogenation catalyst.

The order of mixing of the catalyst components does not appear to be critical. Thus, inverse addition does not appear to affect the nature of the resulting hydrogenation catalyst. Similarly, dilution of the organometallic compound with an inert hydrocarbon, for example, as a matter of convenience in handling, does not adversely affect the resulting catalyst.

In a typical hydrogenation, as little as about 0.3 formula percent, based upon the reducible organic compound and formula weights of the metal salt used in the preparation of the catalyst complex, see, for example, A above, was a highly effective relative amount of catalyst. Lesser amounts, such as 0.03 and 0.003 formula percent of catalyst complex are satisfactory. In general, for a given hydrogen partial pressure and a given reaction temperature, the reaction rate is directly proportional to the relative amount of catalyst employed. Thus, at least about 0.001 formula percent of catalyst should be used, and a generally convenient working range is from 0.01 to 10.0 formula percent of catalyst. Larger relative amounts of catalyst may be desirable where the reducible organic compound is inherently difficult to hydrogenate. Where the hydrogenation catalyst complex is prepared in situ in the presence of the hydrogenation substrate, the above considerations govern the relative amounts of catalyst producing components and medium to be employed, but with the added degree of freedom in that concentrated catalyst dispersions may be prepared and subsequently diluted with the hydrogenation substrate material. Similarly, where preparation is effected in an inert hydrocarbon diluent, such as pentane, heptane, and mixtures of alkanes, practical considerations will, in general, govern the relative amounts to be employed.

*Example 2—Comparison: Ni complex vs. supported Ni catalyst*

Under analogous hydrogenation conditions benzene was hydrogenated using a Ni complex prepared as in 1A, and a conventional active kieselguhr supported Ni catalyst. In the general hydrogenation test procedure, the catalyst and substrate were charged into the reaction zone after which the zone was purged of oxygen using nitrogen. The zone and charge were then heated to the reaction temperature at which time hydrogen gas was rapidly introduced therein up to a maximum pressure of about 70 atmospheres. After the system hydrogen pressure had dropped from hydrogen uptake, but preferably not to a pressure lower than about 35 atmospheres, the system was rapidly repressured to the original maximum pressure. The nickel catalyst of the present invention was so active, however, that after no more than two minutes elapsed reaction time, the hydrogen pressure had dropped to about 14 atmospheres. Efficient agitation was found to be salutary. Results and conditions were as noted in FIGURE 1 of the attached drawings. The present catalyst was at least sixty times more active than the supported catalyst. Moreover, while the supported catalyst yielded a product only about 85% pure, the complexed nickel yielded a product which was at least 99.95% pure cyclohexane.

*Example 3—Iron complex catalyst*

Using procedure 1A, but employing ferrous 2-ethylhexanoate salt, an iron complex catalyst was prepared and benzene was hydrogenated in accordance with the hydrogenation conditions of Example 2. The reaction was essentially complete after 2.5 hours reaction time. Conventional iron hydrogenation catalysts are not known to catalyze the hydrogenation of benzene under these conditions. The resulting cyclohexane was ~100% pure.

*Example 4—Triethyl boron*

Example 1A was repeated except that triethyl boron was substituted for the aluminum alkyl. After a reaction time of 7.3 hours under the conditions of Example 2, the conversion was 74% complete and the yield of cyclohexane was 100%. Correspondingly, other Periodic Table (Mendelyeev) Group III organometallic compounds yield effective hydrogenation catalysts upon reaction with the metal salts of the present invention.

*Example 5*

Example 1A catalyst preparation was repeated, except that for each formula weight of nickel 2-ethylhexanoate, eight moles of triethylaluminum were employed. Upon the introduction of hydrogen gas, pressure about 70 atmospheres, very little hydrogenation activity was noted. After about 20 hours at temperature and pressure, the run was discontinued. Less than 10% of theory of the expected hydrogen uptake had taken place.

*Example 6*

Triethylaluminum was added incrementally to a solution of nickel 2-ethylhexanoate. Analyses of the gas phase of the reaction zone revealed that ethane was a product of the reaction resulting from the mixing. When the reaction was repeated under conditions which permitted the following of the ethane production, it was found that after there had been an addition of about four moles of triethylaluminum per formula weight of the nickel salt, ethane evolution ceased. Correspondingly, active hydrogenation catalysts result from the use of about 1–5 moles of the organometallic compound per formula weight of salt. The best catalysts, in general, result from the use of a ratio of about 2.5–4.5 to 1.

*Example 7*

Example 1A was repeated, except that 0.011 mole of triethylaluminum and no nickel salt was placed in the reaction zone together with the benzene. After 20 hours under the hydrogenation conditions (Example 2), only 0.8 percent of the feed had been converted to product.

*Example 8*

Example 7 was repeated, except that the trialkylaluminum component was omitted. No hydrogenation activity was found.

Example 9

Example 1B was repeated, except that insoluble nickel acetate was substituted for the insoluble nickel salt of benzoic acid. The comparative data of Examples 2 and 9 are shown in FIGURE 2 of the attached drawings.

Figure 2:
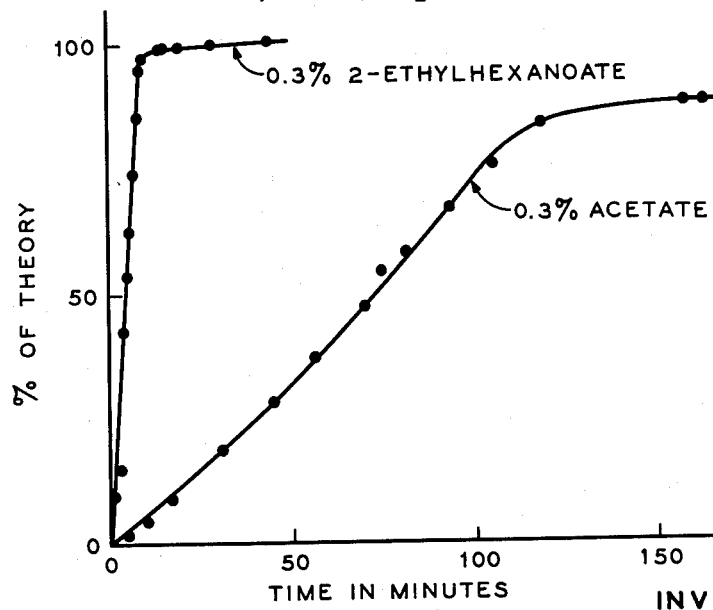

From FIGURES 1 and 2 it is to be appreciated that the catalyst complexes prepared from both hydrocarbon soluble and insoluble nickel organic acid salts are substantially superior to conventional nickel hydrogenation catalysts. (Note: In general, supported nickel catalysts of the prior art have higher unit activities than the unsupported Raney nickel-type catalysts under otherwise comparable hydrogenation conditions.) Hydrocarbon soluble nickel salts are substantially superior to the hydrocarbon insoluble salts for catalyst preparations.

Example 10

In Table I following are listed examples of hydrogenations in which nickel 2-ethylhexanoate salts and triethylaluminum were used for the catalyst preparation (1 formula weight/3 moles) and hydrogen pressures as indicated:

ature and pressure. For hydrogenation substrates relatively difficult to reduce, larger amounts of catalyst relative to the substrate are beneficial.

The hydrogenation of 1,5,9-cyclododecatriene using Raney nickel (U.S. 3,022,359), 6 weight percent (17 mole percent), 30–35° C., 2.4–3.4 atmospheric pressure, 4.5 hours reaction time, yielded an incomplete reaction (95% conversion):

|  | Product, percent |
|---|---|
| Cyclododecadiene | 22 |
| Cyclododecene | 56 |
| Cyclododecane | 22 | although approximately 35 times more catalyst and a pressure about three times greater was used than in Example 8 above. Comparatively, the present hydrogenation catalyst complexes are markedly superior.

Example 11

In Table II following are listed examples of the use of complexed nickel hydrogenation catalysts in the hydrogenation of reducible organic compounds other than hy-

*Table I.—Unsaturated hydrocarbon hydrogenations catalyzed by complexed nickel*

$P_{H_2} \cong$ PRESSURES~70 ATMOSPHERES

| Reactant | Product | Mole, percent Ni | Temp., °C. | Time, hrs. | Conv., percent | Yield, percent |
|---|---|---|---|---|---|---|
| 1. Benzene | Cyclohexane | 0.3 | 150–190 | 0.18 | 100 | 100 |
| 2. Benzene | do | 0.5 | 100–113 | 1.5 | 100 | 100 |
| 3. o-Xylene | 1,2-dimethylcyclohexane | 0.3 | 150 | 3.8 | 98 | 100 |
| 4. 1,3-butadiene | n-Butane | 0.3 | 25–94 | 0.5 | 100 | 100 |
| 5. 4-vinylcyclohexene | Ethylcyclohexane | 0.3 | 100 | 16.0 | 100 | 95 |
| 6. 1,5,9-cyclododecatriene | Cyclododecane | 0.9 | 25 | 0.25 | 100 | 100 |
| 7. Naphthalene | Tetralin | 2.5 | 210 | 18.0 | 100 | 84 |
|  | Decalin |  |  |  |  | 13 |

$P_{H_2} \cong$ ATMOSPHERIC PRESSURE

| | | | | | | |
|---|---|---|---|---|---|---|
| 8. 1,5,9-cyclododecatriene | Cyclododecane | 0.5 | 20–69 | 9.0 | 100 | 100 |

NOTE.—(1) Pentane used in catalyst preparations for Runs 3 and 7.
(2) Toluene used in catalyst preparations for Runs 4 and 6.
(3) In Runs 1, 2, and 5 in situ catalyst preparations made.

The data of Example 10 demonstrate that the present complexed nickel catalysts are highly active hydrogenation catalysts useful for the saturation of reducible (unsaturated) hydrocarbons. Runs 1 and 2 demonstrate temperature effects, and Runs 6 and 8 demonstrate pressure effects; that is, reaction rates are proportional to temperature.

drocarbons. The catalysts were prepared as in Example 1A, i.e., by contacting the catalyst components in the presence of an inert hydrocarbon (pentane, benzene, toluene, etc.) after which the catalyst, the hydrogenation substrate, and hydrogen were contacted under the indicated hydrogenation conditions.

*Table II.—Unsaturated partially oxidized hydrocarbon hydrogenations catalyzed by complexed nickel*

$P_{H_2} \cong 70$ ATMOSPHERES

| Reactant | Product | Mole, percent Ni | Temp., °C. | Time, hrs. | Conv., percent | Yield, percent |
|---|---|---|---|---|---|---|
| 1. Methyl ethyl ketone | 2-butanol | 6.0 | 120 | 2.0 | 100 | 100 |
| 2. Maleic anhydride | Succinic anhydride | 5.0 | 25 | 0.5 | 93 | 100 |
| 3. Cinnamic acid | β-Phenyl propionic acid | 5.0 | 150 | 19.0 | 100 | ~100 |
| 4. Benzoic acid | Cyclohexane carboxylic acid. | 5.0 | 150 | 17.0 | 7 | 100 |
| 5. Dimethyl terephthalate | Dimethyl 1,4-cyclohexane decarboxylate. | 1.0 | 150–170 | 5.0 | 100 | 100 |
| 6. Benzaldehyde | Toluene | 2.5 | 150 | 20.0 | 97 | 19 |
|  | Benzyl alcohol |  |  |  |  | 38 |
| 7. Dimethyl phthalate | Dimethyl 1,2-cyclohexane decarboxylate. | 2.0 | 150 | 0.4 | 100 | 100 |
| 8. Phenol | Cyclohexanol | 5.0 | 151–161 | 2.0 | 97 | 92 |
|  | do |  |  |  |  | 5 |
| 9. Phenol (20 mol percent H₂O added). | do | 5.0 | 150 | 0.08 | 99.5 | 99.6 |
| 10. Nitrocyclohexane | Cyclohexyl amine | 10.0 | 140–207 | 4.8 | 42.0 | 88.0 |
| 11. Isophthalonitrile | m-Xylene diamine | 1.0 | 121 | 5.0 | 99.3 | 38 |
| 12. Isophthalonitrile (NH₃ added ... p.p.=18 atms.). | do | 3.0 | 100 | 8.0 | 99.8 | 70 |
| 13. Pyridine | Piperidine | 5.0 | 148–174 | 2.5 | 92 | 98 |
| 14. Aniline | Cyclohexyl amine | 5.0 | 210 | 15.0 | 73 | 50 |
|  | Dicyclohexyl amine |  |  |  |  | 44 |
| 15. Nitrobenzene | Aniline | 6.0 | 200 | 2.0 | 6 | 100 |

The above examples demonstrate that complexed nickel catalysts are, in general, effective high conversion and high yield producing catalysts for the reduction of many kinds of reducible organic compounds. The result in Example 9 is especially noteworthy for, by comparison, one mole percent nickel as 16% nickel on kieselguhr is reported (Adkins et al., J.A.C.S., 52, 4349 (1930)) to require three hours at 150° C. and 300 p.s.i.g. to reduce phenol. A surprising result was noted in Run 14 in that complexed nickel is a rather poor catalyst for reducing nitrobenzene. By way of comparison and distinction, Raney nickel reductions of nitrobenzene are reportedly easy, even to the point of explosive violence. On the other hand, nitroalkanes are found to be reduced by the present catalyst (cf. Item 10).

*Example 12*

As in Example 2, a catalyst was prepared except that in place of nickel 2-ethylhexanoate, nickel acetylacetonate (i.e., nickel salt of a weak organic acid) was used. Benzene solvent was employed. Conversion and yield were 100%, but a reaction time of 0.8 hour was required. The rate was, therefore, about ¼ that obtained when a strong acid salt was employed.

*Example 13*

As in Example 1A, a complex catalyst was prepared except that chromium 2-ethylhexanoate was substituted for the nickel salt. Under the hydrogenation conditions of Example 2 and after a 20.6 hour reaction period there were obtained a 92.2% conversion and a 100% yield of cyclohexane.

*Example 14*

As in Example 13, except that cobalt 2-ethylhexanoate was substituted for the chromium salt, benzene was hydrogenated. Upon the introduction of hydrogen at 150° C. at a pressure of about 70 atmospheres, a highly exothermic reaction took place and the temperature rose to 203° C. In less than seven minutes, reaction was complete; conversion, 100%; yield, 100%.

*Example 15*

Benzene was hydrogenated as in Example 13, except that cupric 2-ethylhexanoate was used. After 17 hours' reaction time at 150° C. and about 70 atmospheres hydrogen pressure, a 5% conversion to cyclohexane had occurred; yield, 100%.

*Example 16*

The hydrogenation of 3-hexyne was carried out using 0.001 mole of nickel 2-ethylhexanoate and 0.003 mole of triethyl aluminum to prepare the catalyst. At 24–30° C. and 4.4–2.4 atmospheres hydrogen pressure, the following results were noted:

| | | |
|---|---|---|
| Reaction time, hrs. | 0.167 | 1.0 |
| Conversion, percent | 58.1 | 82.8 |
| Product, mole percent: | | |
| n-Hexane | 22.6 | 99.9 |
| Trans-3-hexene | 19.4 | --- |
| Cis-3-hexene | 53.9 | 0.1 |
| Cis-2-hexene | 4.9 | --- |

The above examples demonstrate that 3-*d* complex elements of the iron group generally can be used under the conditions of the present invention to prepare effective hydrogenation catalysts.

Clearly, many modifications and variations of the invention, as above set forth, may be made without departing from the spirit and scope thereof and of the appended claims.

I claim:
1. Method for the preparation of a complex hydrogenation catalyst which comprises reacting in the presence of an inert liquid hydrocarbon diluent at a temperature in the range from about −50° to 200° C. under autogenous pressure
   (a) one formula weight of a metal salt of an acidic organic compound, said metal having an atomic number greater than 20 and less than 30, and said organic acid having a pKa in the range from about 1–20, from 1–25 carbon atoms, from 1–2 acidic hydrogen atoms, and only carbon, hydrogen, and oxygen; and
   (b) from 1–6 moles of a Mendelyeev Periodic Table Group III organometallic compound, $MR_3$, in which M is a Group III element and R is selected from the radical groups consisting of hydrocarbyl and hydrogen, said hydrocarbyl radicals having from 1–20 carbon atoms per group, and wherein at least one radical group of said compound is hydrocarbyl.
2. The method of claim 1, wherein said reacting is in the absence of a diluent.
3. The method of claim 1, wherein aluminum is the metal component of said organometallic compound.
4. The method of claim 3, wherein for each formula weight of said metal salt, 2.5 to 4.5 moles of said organometallic compound is used in the reacting.
5. The method of claim 4, wherein said organic acid is monobasic, having a solubility in benzene in parts per 100 parts at 25° C. of at least 0.1 part.
6. The method of claim 5, wherein said atomic number is greater than 25 and less than 29.
7. The method of claim 6, wherein said organic acid is carboxylic, having a pKa less than 9.
8. The composition of claim 7.
9. Method of decreasing the unsaturation of a reducible organic compound which comprises contacting said compound in the liquid phase with hydrogen in the presence of at least 0.001 formula percent of a complex hydrogenation catalyst prepared as in claim 1, said contacting being at a temperature in the range −10° to 300° C., at a hydrogen pressure of from 1–1000 atmospheres and for a period of from about 0.00025 to 50 hours, and recovering the resulting hydrogenated organic compound.
10. The method of claim 9, wherein said catalyst is prepared as in claim 7, and said reducible compound is an unsaturated hydrocarbon.
11. The method of claim 10, wherein said reducible hydrocarbon is a cyclic hydrocarbon.
12. The method of claim 9, wherein said reducible compound is phenol.
13. The method of claim 9 wherein said reducible compound is a lower alkyl ester of an unsubstituted benzene carboxylic acid.
14. The method of claim 13, wherein at least one of the hydrogen atoms attached to the aromatic nucleus of said ester is substituted for by a hydrocarbyl group.

References Cited by the Examiner

UNITED STATES PATENTS 2,999,075   9/61   Pruett _____ 252—472

ALPHONSO D. SULLIVAN, *Primary Examiner.*